United States Patent [19]

Schimmels

[11] 4,080,522
[45] Mar. 21, 1978

[54] SNAP-IN ARRANGEMENT FOR MOUNTING DEVICES IN A SUPPORT PANEL APERTURE

[75] Inventor: Thomas J. Schimmels, Milwaukee, Wis.

[73] Assignee: Cutler-Hammer, Inc., Milwaukee, Wis.

[21] Appl. No.: 694,766

[22] Filed: Jun. 10, 1976

[51] Int. Cl.² ............................................. H01H 9/02
[52] U.S. Cl. .................................. 200/295; 200/296; 248/27.3; 339/128
[58] Field of Search ............... 200/296, 295; 248/27.1, 248/27.3; 339/128, 126 R

[56] References Cited

U.S. PATENT DOCUMENTS

| 2,892,011 | 6/1959 | Glueckstein | 248/27.3 X |
| 3,514,743 | 5/1970 | Schantz | 339/128 |
| 3,530,426 | 9/1970 | Snyder | 339/128 |
| 3,573,716 | 4/1971 | Garver | 339/128 |
| 3,609,268 | 9/1971 | Sanchez | 339/128 X |
| 3,701,870 | 10/1972 | Sorenson | 200/295 |
| 3,725,626 | 4/1973 | Kruse | 200/295 |
| 3,790,923 | 2/1974 | Mathe | 339/128 |
| 3,941,965 | 3/1976 | Piber | 200/296 |

*Primary Examiner*—J. V. Truhe
*Assistant Examiner*—D. A. Tone
*Attorney, Agent, or Firm*—Michael, Best & Friedrich

[57] ABSTRACT

The snap-in arrangement includes a resilient locking flange and a resilient skirt located on the outer end of and extending from the opposite sides of a bushing which extends from a switch frame mounted on a switch base of an electrical toggle switch assembly and pivotally supports a toggle lever for actuating switch contacts housed on the switch base. The locking flange, which terminates in a lip, is first inserted through a square or rectangular support panel mounting hole and is hooked over one edge of the hole. The lip abuts the front of the panel and cooperates with a ridge provided on the bushing body and adapted to abut the back of the panel to secure one side of the bushing on the panel. The switch assembly is thereafter rotated relative to the back of the panel so that the outer portion of the skirt can be squeezed through the mounting hole and the skirt thereafter returns toward an undeflected condition. The side of the bushing including the skirt is secured on the panel by the cooperation of a shoulder on the skirt adapted to bear against the front of the panel and a bearing surface provided on a resilient retainer member and adapted to bear against the back of the panel.

In one embodiment the retainer member is an integral extension of the skirt and in other embodiments the retainer member is formed integrally with the bushing body.

15 Claims, 9 Drawing Figures

SNAP-IN ARRANGEMENT FOR MOUNTING DEVICES IN A SUPPORT PANEL APERTURE

BACKGROUND OF THE INVENTION

This invention relates to push-in or snap-in mounting means for mounting a device in the hole of a mounting panel and, more particularly, to such mounting means adapted for use with electrical devices, such as a toggle switch or the like.

Push-in or snap-in mounting means for mounting devices such as toggle switches and other electrical components in a hole provided in a bulkhead or support panel are known. Many prior art panel mounting means have relatively complex constructions, require special tools for mounting and/or the mount does not provide a smooth and neat appearance at the front of the panel.

SUMMARY OF THE INVENTION

An object of the invention is to provide a snap-in mounting arrangement which is adapted for mounting devices, such as electrical switches and the like, in a support panel mounting hole and which is arranged to facilitate simple and quick installation of the device without special tools.

Another object of the invention is to provide such a snap-in mounting arrangement which permits the device to be installed in a square or rectangular mounting hole from the back of the panel and presents a smooth and neat appearance from the front of the panel.

A further object of the invention is to provide such a snap-in mounting arrangement which is arranged to accommodate support panels of different thicknesses.

The snap-in arrangement provided by the invention includes a bushing having an outer end portion to be received in the mounting hole of a support panel on which the device is to be mounted and carrying a part which is to be accessible from the front of the panel after mounting. The snap-in arrangement further includes a resilient locking flange flaring from the outer end portion of the bushing on a first side of the bushing toward the device and terminating in a lip adapted to bear against the front side of the panel, one or more ridges on the first side of the bushing adapted to abut the back of the panel, a resilient, inwardly deflectable skirt extending from the top portion of the bushing on the opposite or second side of the bushing toward the device and having a shoulder adapted to abut the front side of the panel at the opposite side of the mounting hole and a resilient retainer member located on the second side of the bushing and having one or more surfaces adapted to bear against the back of the panel at the opposite side of the panel.

After the flange has been inserted through the mounting hole, the lip thereof cooperates with a bushing ridge to secure the first side of the bushing on the panel. As the skirt is thereafter pushed into the opposite or second side of the mounting hole, it is deflected inwardly to permit passage through the hole and then snaps back toward an undeflected condition where the shoulder thereof abuts the front of the panel at the second side of the mounting hole and cooperates with a bearing surface of the retainer member to secure the second side of the bushing on the panel. When the mounting hole is square or rectangular, the flange and skirt cover the sides of the hole and the opposite ends of the bushing body substantially completely fill the hole, thereby presenting a smooth and neat appearance at the front of the panel.

The retainer member can be formed as an integral extension of the skirt or be separate from the skirt and formed integrally with the second side of the bushing. In order to accommodate panels having different thicknesses, the first side of the bushing can be provided with a plurality of ridges which are spaced at different distances from the flange lip and the retainer member can be provided with a plurality of serrations or steps which are spaced at different distances from the skirt shoulder.

Other objects, aspects and advantages of the invention will become apparent upon reviewing the following detailed description, the drawings and the appended claims.

DESCRIPTION OF THE PREFERRED EMBODIMENTS

Figure 1:
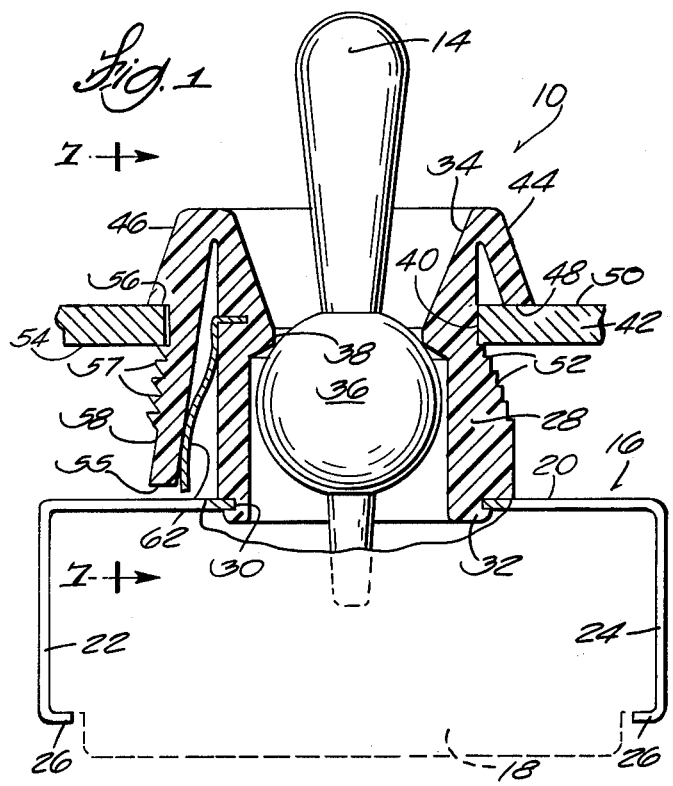
FIG. 1 is a partially sectioned, side elevation view of a one-hole, mounting snap-in toggle switch assembly embodying various of the features of the invention shown mounted on a bulkhead or support panel.
Figure 2:
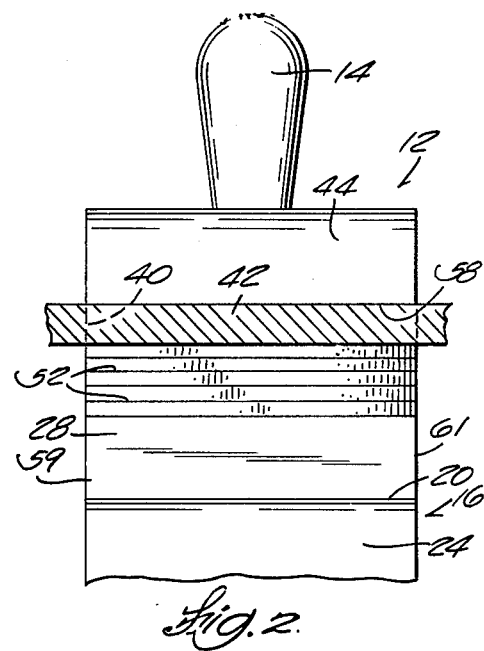
FIG. 2 is a fragmentary, partially sectioned right and elevational view of the switch assembly of FIG. 1.
Figure 7:
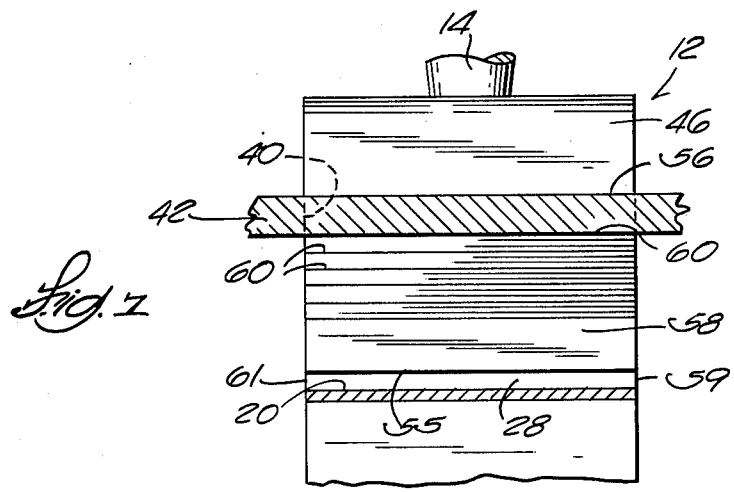
FIG. 7 is a partial cross-sectional view taken along the line 7—7 in FIG. 1.

Illustrated in FIGS. 1, 2 and 7 is an electrical toggle switch assembly 10 incorporating a snap-in mounting means of the invention. The toggle switch assembly 10 includes a snap-in bushing 12, a toggle lever 14, a switch frame 16 and an insulating switch base 18 (illustrated schematically by dashed lines) which houses electrical contacts (not shown). The switch base 18 and the toggle lever 14 are of conventional design so a detailed illustration and description of the structural features thereof are not necessary for a full understanding of the invention. For example, the Miller U.S. Pat. No. 3,146,330, issued Aug. 25, 1964, illustrates a toggle switch assembly including a switch base and toggle lever arrangement adaptable for use in the invention.

The switch frame 16 has a generally rectangular top 20 and a pair of depending legs 22, 24, one at each end. Located on the lower end of each leg 22 and 24 is one or more tabs 26 which, upon assembly of the switch frame 16 on the switch base 18, are bent over into engagement with the switch base to securely retain in the switch frame on the switch base with the top 20 covering the open top of the switch base.

The bushing 12 includes a main body 28 which has a generally rectangular cross section and is suitably mounted, at the lower end, on the top 20 of the switch frame 16 coaxially with an aperture 30 provided in the switch frame 16. While various mounting arrangements can be used, in the specific illustration, a relatively thin annular extension 32 is provided on the lower or inner end of the bushing body 28 and this extension is swaged into tight engagement with the underside of the switch frame 16. If desired, the bushing 12 and the switch frame 16 can be formed as a one-piece unit, such as by molding from a suitable insulating thermoplastic material, and the unit is suitably mounted on the switch base 18, such as by rivets or bolts extending through the switch base.

The bushing 12 has a central bore 34 for receiving the toggle lever 14 which has an external handle and extends through the bushing bore 34 with the lower end thereof extending into the switch base for actuation of switch contacts, for example, as disclosed in the above-identified Miller Patent. The toggle lever 14 also includes an enlarged spherical portion 36 which bears against a constricted portion 38 of the bushing 34 to afford pivotal movement of the toggle lever relative to the bushing during actuating movement thereof.

The bushing 12 includes an integral push-in or snap-in means which is arranged to permit the outer or top end portion of the bushing to be pressed through a rectangular or square mounting hole 40 in a bulkhead or support panel 42 on which the switch assembly 10 is to be mounted from the rear or back side and thereafter serves to assist in securing the switch assembly on the support panel.

Located on the opposite sides of the bushing 12 for this purpose is a resilient locking flange 44 and a resilient skirt 46. As viewed in FIG. 1, the locking flange 44 is located on the right side of the bushing 12, flares outwardly from the outer or top end of the bushing 12 toward the switch frame 16 and terminates in a locking lip 48 which is adapted to bear against the front side 50 of the panel at one side of the mounting hole 40.

The right side of the bushing body 28 is provided with at least one ridge having a laterally extending shoulder or surface 52 which is spaced from the lip 48 at a distance approximating the thickness of the support panel 42 and is adapted to abut the back side 54 of the support panel adjacent the mounting hole. The ridge surface 52 cooperates with the flange lip 48 to secure one side (i.e., the right side as viewed in FIG. 1) of the bushing 12 on the support panel. Preferably, as shown in the drawings, the right side of the bushing 12 is provided with a plurality of ridges with the abutting surfaces 52 thereof being located in vertical, parallel-spaced relation to each other and spaced from the lip 48 at different distances so as to accommodate a range of different panel thicknesses. That is, whatever this panel thickness might be over a predetermined range, e.g., 1/32 to ¼ inch, one of the ridge surfaces 52 will abut the back side of the support panel.

As viewed in FIG. 1, the skirt 46 is located on the left side of the bushing 12, flares outwardly from the top end of the bushing toward the switch frame 16 and terminates in an inner or lower end 55 spaced from the switch frame 16. The skirt 46 has a shoulder 56 adapted to abut the front side of the support panel at the side of the mounting hole 40 opposite to the locking flange 44. The skirt 46 also has an integral extension 58 extending downwardly from the shoulder 56 and including at least one serration 57 (FIG. 1) having a laterally extending bearing surface 60 (FIG. 7) which is spaced from the shoulder 56 at a distance approximating the thickness of the support panel 42 and is adapted to bear against the back side of the support panel adjacent the mounting hole. The serration bearing surface 60 cooperates with the skirt shoulder 56 to secure the other side (i.e., the left side as viewed in FIG. 1) of the bushing 12 on the support panel 42. Preferably, as shown in FIG. 1, the skirt extension 58 is provided with a plurality of serrations with the bearing surfaces 60 thereof being located in vertical parallel-spaced relationship to each other and spaced from the skirt shoulder 56 at different distances so as to accommodate a range of different panel thicknesses in the same manner as the ridges on the right side of the bushing body 28.

During mounting, the switch assembly 10 is cocked relative to the rear of the support panel 42 and the right side of the bushing 12 is first inserted through the mounting hole 40 to hook the locking flange 44 in place on the front of the panel 42. The switch assembly 10 is then rocked, i.e., rotated clockwise as viewed in FIG. 1, to snap the left side of the bushing 12 into the mounting hole. That is, as the switch assembly 10 is moved clockwise, the outer tapered surface of the skirt 46 engages the edge of the mounting hole 40 and is cammed or deflected thereby inwardly towards the bushing body 28 so that the outer end portion of the skirt 46 can be inserted through the mounting hole. When the skirt shoulder 56 is moved past the top edge of the mounting hole 40, the skirt 46 snaps back towards a left deflected position where the shoulder 56 abuts the front side of the mounting panel and a serration bearing surface 60 bears against the back side of the mounting panel adjacent the left side of the mounting hole 40. As shown in FIGS. 2 and 7, the bushing body 28 is dimensioned so that its opposite ends 59 and 61 substantially fill the mounting hole 40.

In order to improve the retention force provided by the bushing snap-in arrangement, a metallic leaf spring 62 can be mounted between the bushing body 28 and the skirt 46 with one end affixed to the bushing body and the free end bearing against the inside surface of the skirt extension 58 so as to urge a portion of the skirt extension beneath the shoulder 56 into engagement with the corresponding wall of the mounting hole 40, and thereby also urge the opposite side of the bushing body into engagement with the corresponding wall of the mounting hole 40.

To minimize fabrication cost, the bushing, including the locking flange and the skirt, of the embodiment illustrated in FIGS. 1, 2 and 7 and of the other illustrated embodiments to be described, can be formed as a one-piece unit from a relatively rigid, electrically insulating, synthetic thermoplastic material, such as "Lexan" marketed by General Electric.

FIGS. 3-8 illustrate alternate constructions for the bushing. In all of these alternate constructions, the right side of the bushing is arranged and functions in the same manner as bushing 12 in the embodiment illustrated in FIGS. 1, 2 and 7.

Figure 3:
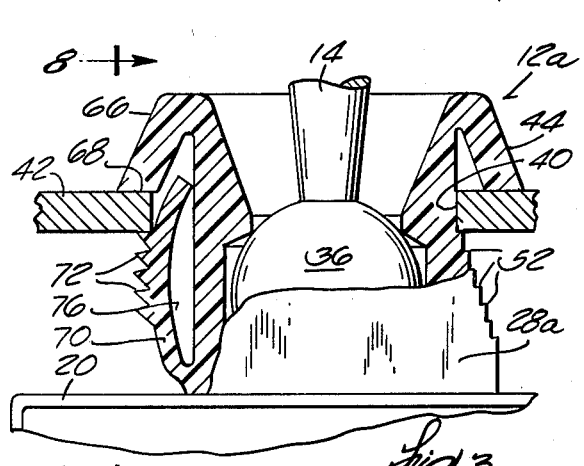
FIG. 3 is a view similar to FIG. 1 illustrating a first alternate construction for the snap-in bushing.
Figure 8:
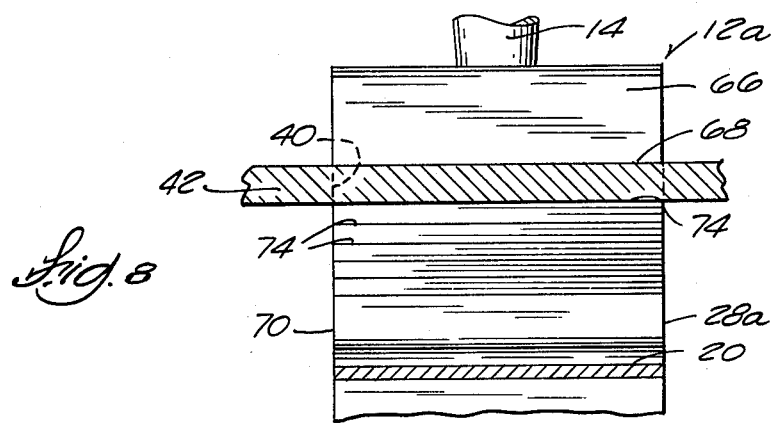
FIG. 8 is a partial cross-sectional view taken along the line 8—8 in FIG. 3.

In the embodiment illustrated in FIGS. 3 and 8, a resilient snap-in skirt 66 is provided on the left side of the bushing 12a. The skirt 66 terminates in a shoulder 68 which is adapted to bear against the front side of the panel 42 when the switch assembly 10 is mounted thereon. Extending from the left side of the bushing body 28a, generally beneath the skirt 66, is an outwardly bowed, resilient, retainer member 70 which is integrally connected at the lower end to the lower portion of the bushing body 28a and has a free upper end so as to afford deflection relative to the bushing body. The retainer member 70 includes at least one and preferably a plurality of serrations 72 which are arranged to function in the same general manner as the serrations 57 on the skirt extension 58 of the embodiment illustrated in FIGS. 1, 2 and 7. That is, each serration 72 has a laterally extending bearing surface 74 (FIG. 8) which is adapted to abut the back side of the panel 42 adjacent the mounting hole 40 and to cooperate with the skirt shoulder 68 to retain the left side of the bushing 12a on the panel in the same general manner as described above for the embodiment illustrated in FIGS. 1, 2 and 7. A biasing means (not shown) can be mounted within the spacing 76 between the retainer member 70 and the bushing body 28a for urging a bearing surface 74 of the serrations 72 into engagement with the edge of the mounting hole 40 and thereby enhance the retention force provided by the retainer member 70.

Figure 4:
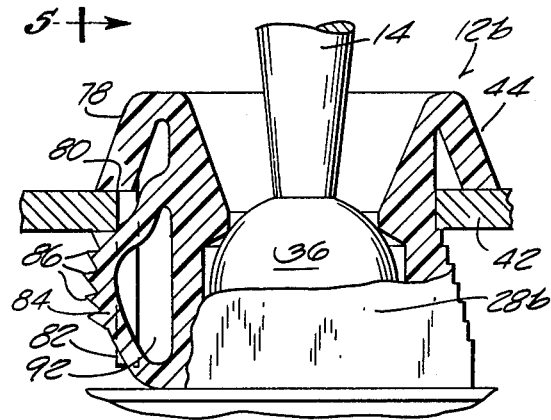
FIG. 4 is a view similar to FIG. 1 illustrating a second alternate construction for the snap-in bushing.
Figure 5:
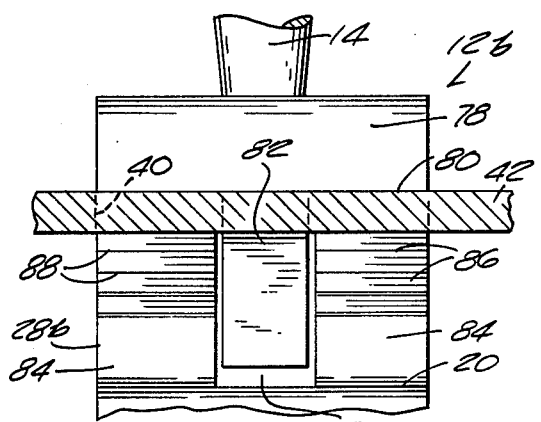
FIG. 5 is a partial cross-sectional view taken along the line 5—5 in FIG. 4.

In the embodiment illustrated in FIGS. 4 and 5, a resilient snap-in skirt 78 is provided on the left side of the bushing 12b. The skirt 78 includes a shoulder 80 which serves the same general function as the skirt shoulder 56 of the embodiment illustrated in FIGS. 1, 2 and 7, and a finger 82 extending downwardly from the shoulder 80. Extending integrally from the inner or lower portion of the left side of the bushing body 28b is a pair of laterally spaced, resilient retainer members 84, each of which curves or bows outwardly from the bushing body 28b and is integrally connected at the opposite ends to the bushing body 28b. Each of the retainer members 84 has at least one and preferably a plurality of serrations 86 (FIG. 4) which are arranged to function in the same manner as the skirt extension serrations 57 of the embodiment illustrated in FIGS. 1, 2 and 7. That is, each serration 86 has a laterally extending bearing surface 88 (FIG. 5) which is adapted to abut the backside of the panel 42 adjacent the mounting hole 40 and to cooperate with the skirt shoulder 80 to retain the left side of the bushing 12b on the panel in the same general manner as described above for the embodiment illustrated in FIGS. 1, 2 and 7.

The skirt finger 82 extends into the spacing 90 between the retainer member 84 and bears against one wall of the mounting hole 40 (FIG. 4) to urge the right side of the bushing body 28b into engagement with the opposite side wall of the mounting hole 40 and thereby minimize lateral movement of the switch assembly relative to the panel 42 after mounting. As with the embodiment illustrated in FIGS. 3 and 7, a biasing means (not shown) can be mounted in the spacing 92 between each retainer member 84 and the biasing body 28b for urging a serration bearing surface 88 thereof into engagement with the edge of the mounting hole 40 and thereby enhance the retention force provided by the retainer member 84.

Figure 6:
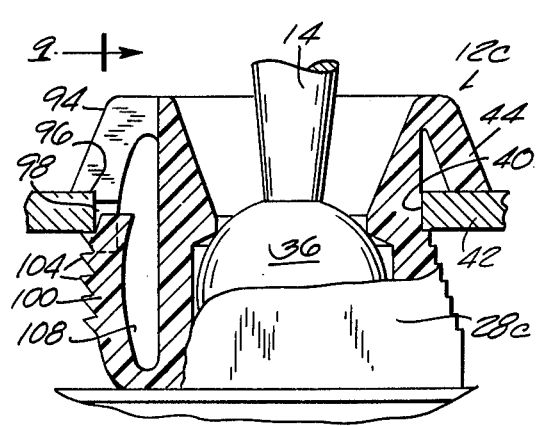
FIG. 6 is a view similar to FIG. 1 illustrating a third alternate construction for the snap-in bushing.
Figure 9:
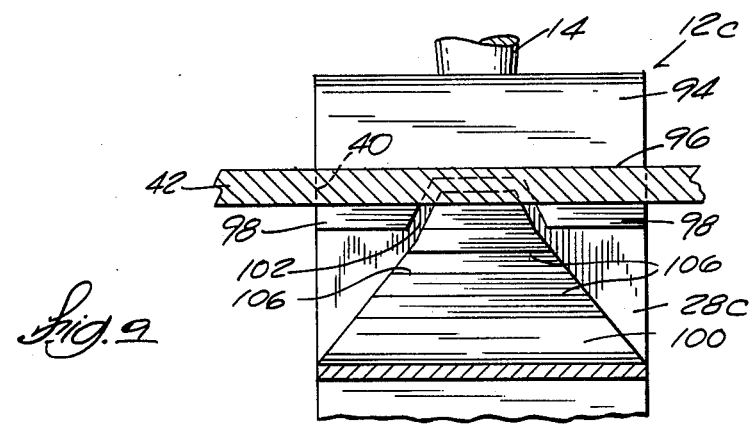
FIG. 9 is a partial cross-sectional view taken along the line 9—9 in FIG. 6.

In the embodiment illustrated in FIGS. 6 and 9, a resilient snap-in skirt 94 is provided on the left side of the bushing 12c. The skirt 94 includes a shoulder 96 which serves the same general purpose as the skirt shoulders 56 and 80 of the embodiments illustrated in FIGS. 1, 2 and 7 and FIGS. 4 and 5, respectively, and a pair of laterally spaced tongues 98 extending downwardly from the shoulder 96. Extending upwardly from the inner or lower portion of the left side of the bushing body 28c is a resilient retainer member 100 which flares outwardly from the bushing body 28c and includes an upper end portion which fits into the spacing 102 between the skirt tongues 98 as best shown in FIG. 9. The retainer member 100 preferably has a truncated triangular shape and the spacing 102 between the skirt tongues 98 has a corresponding shape to accommodate the upper end portion of the retainer member 100.

As with the other illustrated embodiments, the retainer member 100 has at least one and preferably a plurality of steps or serrations 104 (FIG. 6) which are arranged to function in the same general manner as the serrations in the other illustrated embodiments. That is, each serration 104 has a laterally extending bearing surface 106 (FIG. 9) which is adapted to abut the back side of the panel 42 adjacent the mounting hole 40 and to cooperate with the skirt shoulder 96 to retain the left side of the bushing 12c on the panel in the same general manner described above. The skirt tongues 98 serve the same general function as the skirt finger 82 of the embodiment illustrated in FIGS. 4 and 5. As with the other illustrated embodiments, a biasing means (not shown) can be mounted in the spacing 108 between the retainer member 100 and the bushing body 28c for urging a serration bearing surface 106 into engagement with the edge of the mounting hole and thereby enhance the retention force provided by the retainer member 100.

While the preferred embodiments have been illustrated and described in detail, it will be apparent to those skilled in the art that various changes and modifications can be made thereto to adapt the invention to various uses without departing from the scope of the appended claims.

I claim:

1. A snap-in mounting means for a device adapting the device to be mounted from the back of and through a hole in a support panel to secure the device to the panel so that a part of the device is accessible from the front of the panel comprising a bushing carrying the accessible part of the device and adapted to be received in the panel mounting hole, said bushing having first and second opposed walls, a resilient locking flange flaring from the top portion of said first bushing wall toward the device and terminating in a locking lip adapted to resiliently bear against the front side of the panel at one side of the mounting hole after said locking flange has been inserted through said one side of the mounting hole, a ridge on said first bushing wall including a surface adapted to abut the backside of the panel at said one side of the mounting hole and to cooperate with said lip to secure the side of said bushing including said locking flange on the panel;

a resilient skirt extending from the top portion of said second bushing wall in spaced relationship thereto toward the device, said skirt including a shoulder adapted to abut the front side of the panel at the opposite side of said mounting hole and an integral extension extending from said shoulder toward the device and having at least one laterally extending serration including a surface adapted to resiliently bear against the backside of the panel at said opposite side of the mounting hole, said skirt being deflectable toward said second bushing wall so as to permit the passage of at least the top portion thereof including said shoulder through said opposite side of the mounting hole, whereafter said skirt returns toward an undeflected condition wherein said shoulder abuts the front side of the panel at said opposite side of the mounting hole and said serration surface bears against the backside of the panel at said opposite side of the mounting hole and cooperates with said shoulder to secure the side of said bushing including said skirt on the panel.

2. A snap-in mounting means according to claim 1 including means disposed between said skirt and said second bushing wall for biasing a portion of said skirt beneath said shoulder into engagement with a wall of the mounting hole.

3. A snap-in mounting means according to claim 2 wherein said biasing means comprises a leaf spring having one end affixed to said second bushing wall and a free end portion bearing against the inside surface of said skirt extension.

4. A snap-in mounting means according to claim 2 wherein
said first bushing wall includes a plurality of said ridges with the abutting surfaces thereof located in vertical, parallel-spaced relationship, and
said skirt extension includes a plurality of said serrations with the bearing surfaces thereof located in vertical, parallel-spaced relationship, said abutting surfaces of said ridges and said bearing surfaces of said serrations being spaced different distances from said locking lip and said shoulder, respectively, to accommodate a range of different panel thicknesses and assure that, whatever that thickness might be, one of said ridge abutting surfaces and one of said serration bearing surfaces will bear against the back side of the panel.

5. A snap-in mounting means according to claim 4 wherein
said device is an electrical toggle switch including a base housing switch contacts, a toggle lever for actuating said switch contacts and a switch frame mounted on said switch base, and
said housing is mounted on and extends outwardly from said switch frame and pivotally supports said toggle lever.

6. A snap-in mounting means according to claim 1 wherein
said device is an electrial toggle switch including a base housing switch contacts, a toggle lever for actuating said switch contacts and a switch frame mounted on said switch base, and
said bushing is mounted on and extends outwardly from said switch frame and pivotally supports said toggle lever.

7. A snap-in mounting means for a device adapting the device to be mounted from the back of and through a hole in a support panel to secure the device to the panel so that a part of the device is accessible from the front of the panel comprising
a bushing carrying the accessible part of the device and adapted to be received in the panel mounting hole, said bushing having first and second opposed walls,
a resilient locking flange flaring from the top portion of said first bushing wall toward the device and terminating in a locking lip adapted to resiliently bear against the front side of the panel at one side of the mounting hole after said locking flange has been inserted through said one side of the mounting hole,
a ridge on said first bushing wall including a surface adapted to abut the backside of the panel at said one side of the mounting hole and to cooperate with said lip to secure the side of said bushing including said locking flange on the panel,
a resilient skirt extending from the top portion of said second bushing wall in spaced relationship thereto toward the device and terminating in a shoulder adapted to abut the front side of the panel at the opposite side of said mounting hole, said skirt being deflectable toward said second bushing wall so as to permit the passage thereof through said opposite side of the mounting hole, whereafter said skirt returns toward an undeflected condition and said shoulder abuts the front side of the panel at said opposite side of the mounting hole, and
a retainer means comprising an outwardly bowed resilient member having the opposite ends thereof integrally connected to said second bushing wall and having at least one serration including a surface which, after said skirt has been inserted through the mounting hole, is adapted to resiliently bear against the back side of the panel at said opposite side of the mounting hole and to cooperate with said skirt shoulder to secure the side of said bushing including said skirt on the panel.

8. A snap-in mounting means according to claim 7 wherein
said first bushing wall includes a plurality of said ridges with the abutting surfaces thereof located in vertical, parallel-spaced relationship, and
said resilient number includes a plurality of said serrations with the bearing surfaces thereof located in vertical, parallel-spaced relationship, said abutting surfaces of said ridges and said bearing surface of said serrations being spaced different distances from said locking lip and said shoulder, respectively, to accommodate a range of different panel thicknesses and assure that, whatever that thickness might be, one of said ridge abutting surfaces and one of said serration bearing surfaces will bear against the back side of the panel.

9. A snap-in mounting means according to claim 8 wherein
said device is an electrical toggle switch including a base housing switch contacts, a toggle lever for actuating said switch contacts and a switch frame mounted on said switch base, and
said housing is mounted on and extends outwardly from said switch frame and pivotally supports said toggle lever.

10. A snap-in mounting means for a device adapting the device to be mounted from the back of and through a hole in a support panel to secure the device to the panel so that a part of the device is accessible from the front of the panel comprising
a bushing carrying the accessible part of the device and adapted to be received in the panel mounting hole, said bushing having first and second opposed walls,
a resilient locking flange flaring from the top portion of said first bushing wall toward the device and terminating in a locking lip adapted to resiliently bear against the front side of the panel at one side of the mounting hole after said locking flange has been inserted through said one side of the mounting hole,
a ridge on said first bushing wall including a surface adapted to abut the backside of the panel at said one side of the mounting hole and to cooperate with said lip to secure the side of said bushing including said locking flange on the panel, a resilient skirt extending from the top portion of said second bushing wall in spaced relationship thereto toward the device and including a shoulder adapted to abut the front side of the panel at the opposite side of said mounting hole, said skirt being deflectable toward said second bushing wall so as to permit the passage of at least the top portion thereof including said shoulder through said opposite side of the mounting hole, whereafter said skirt returns toward an undeflected condition and said shoulder abuts the front side of the panel at said opposite side of the mounting hole, and a retainer means including a pair of laterally spaced, outwardly bowed resilient members having the opposite ends thereof integrally connected with said bushing wall, each of said resilient members having at least one serration including a surface which, after said bushing top portion has been inserted through the mounting hole, is adapted to resiliently bear against the backside of the panel at said opposite side of the mounting hole and to cooperate with said skirt shoulder to secure the side of said bushing including said skirt on the panel, said retainer means further including a finger on said skirt extending downwardly from said shoulder toward the device and disposed in the spacing between said resilient members, said finger including an outer surface adapted to bear against a wall of the mounting hole when the device is mounted on the panel.

11. A snap-in mounting means according to claim 10 wherein said first bushing wall includes a plurality of said ridges with the abutting surfaces thereof located in vertical, parallel-spaced relationship; and each of said resilient members includes a plurality of said serrations with the bearing surfaces thereof located in vertical, parallel-spaced relationship, said abutting surfaces of said ridges and said bearing surfaces of said serrations being spaced different distances from said locking lip and said shoulder, respectively, to accommodate a range of different panel thicknesses and assure that, whatever that thickness might be, one of said abutting surfaces and one of said bearing surfaces will bear against the back side of the panel.

12. A snap-in mounting means according to claim 11 wherein said device is an electrical toggle switch including a base housing switch contacts, a toggle lever for actuating said switch contacts and a switch frame mounted on said switch base, and said housing is mounted on and extends outwardly from said switch frame and pivotally supports said toggle lever.

13. A snap-in mounting means for a device adapting the device to be mounted from the back of and through a hole in a support panel to secure the device to the panel so that a part of the device is accessible from the front of the panel comprising a bushing carrying the accessible part of the device and adapted to be received in the panel mounting hole, said bushing having first and second opposed walls, a resilient locking flange flaring from the top portion of said first bushing wall toward the device and terminating in a locking lip adapted to resiliently bear against the front side of the panel at one side of the mounting hole after said locking flange has been inserted through said one side of the mounting hole, a ridge on said first bushing wall including a surface adapted to abut the backside of the panel at said one side of the mounting hole and to cooperate with said lip to secure the side of said bushing including said locking flange on the panel, a resilient skirt extending from the top portion of said second bushing wall in spaced relationship thereto toward the device, said skirt including a shoulder adapted to abut the front side of the panel at the opposite side of said mounting hole and a pair of laterally spaced fingers extending downwardly from said shoulder and having an outer surface adapted to bear against the wall of the mounting hole on said opposite side thereof, said skirt being deflectable toward said second bushing wall so as to permit the passage of the top portion thereof including said shoulder through said opposite side of the mounting hole, whereafter said skirt returns toward an undeflected condition wherein shoulder abuts the front side of the panel at said opposite side of the mounting hole and said outer surfaces of said fingers bear against the wall of the mounting hole, and a retainer means including a generally triangularly shaped, resilient member connected at the base to the lower portion of said second bushing wall and extending upwardly and outwardly therefrom toward said skirt shoulder with the upper end portion being received in the spacing between said fingers, said triangular member including at least one laterally extending serration having a surface which, after said bushing top portion has been inserted through the mounting hole, is adapted to resiliently bear against the backside of the panel at said opposite side of the mounting hole and to cooperate with said skirt shoulder and said fingers to secure the side of said bushing including said skirt on the panel.

14. A snap-in mounting means according to claim 13 wherein said first bushing wall includes a plurality of said ridges with the abutting surfaces thereof located in vertical, parallel-spaced relationship and said triangular member includes a plurality of said serrations with the bearing surfaces thereof located in vertical, parallel-spaced relationship, said abutting surfaces of said ridges and said bearing surfaces of said serrations being spaced different distances from said locking lip and said shoulder, respectively, to accommodate a range of different panel thicknessess and assure that, whatever that thickness might be, one of said abutting surfaces and one of said bearing surfaces will bear against the back side of the panel.

15. A snap-in mounting means according to claim 14 wherein said device is an electrical toggle switch including a base housing switch contacts, a toggle lever for actuating said switch contacts and a switch frame mounted on said switch base, and said housing is mounted on and extends outwardly from said switch frame and pivotally supports said toggle lever.

* * * * *